United States Patent [19]

Nishizawa et al.

[11] Patent Number: 5,507,553
[45] Date of Patent: Apr. 16, 1996

[54] EMERGENCY LOCKING DEVICE FOR VEHICLE SEAT

[75] Inventors: Yoji Nishizawa; Masatatsu Kanai, both of Akishima, Japan

[73] Assignee: Tachi-S Co., Ltd., Tokyo, Japan

[21] Appl. No.: 294,832

[22] Filed: Aug. 29, 1994

[51] Int. Cl.$^6$ ..................................... B60N 2/42
[52] U.S. Cl. ................... 297/216.13; 297/216.14; 297/378.1
[58] Field of Search .................. 297/216.1, 216.13, 297/216.14, 378.1, 378.11, 378.12

[56] References Cited

U.S. PATENT DOCUMENTS

| | | | |
|---|---|---|---|
| 3,848,923 | 11/1974 | Dehler | 297/378.11 X |
| 4,219,234 | 8/1980 | Bell. | |
| 4,365,837 | 12/1982 | Mizelle. | |
| 4,390,208 | 6/1983 | Widmer et al. . | |
| 4,997,223 | 3/1991 | Croft | 297/378.12 X |
| 5,161,856 | 11/1992 | Nishino. | |
| 5,163,736 | 11/1992 | Aljundi. | |
| 5,346,281 | 9/1994 | Hughes | 297/378.11 X |

FOREIGN PATENT DOCUMENTS

| | | | |
|---|---|---|---|
| 2708461 | 8/1978 | Germany | 297/378.11 |
| 2808889 | 9/1979 | Germany | 297/378.12 |
| 3701419 | 7/1988 | Germany | 297/378.11 |

*Primary Examiner*—Peter R. Brown
*Attorney, Agent, or Firm*—Browdy and Neimark

[57] ABSTRACT

An emergency locking device for a vehicle seat of the type wherein one lateral frame section of seat back frame is rotatably connected to a seat cushion frame, while another lateral frame section of seat back frame is connected thereto via one reclining device, the emergency locking device basically comprising an outwardly toothed lock element and an inwardly toothed lock element, which are provided at such one lateral frame section of seat back frame, with such an arrangement that a displacement of the seat back frame or a slight deformation of same, which is caused by a great load, will quickly bring one of the outwardly and inwardly toothed lock elements to engagement with another of them, to thereby lock that one lateral frame section in question against further serious deformation. The locking device is thus simplified in structure and light in weight.

9 Claims, 4 Drawing Sheets

EMERGENCY LOCKING DEVICE FOR VEHICLE SEAT

BACKGROUND OF INVENTION

1. Field of Invention

The present invention relates to an emergency locking device for a vehicle seat or an automotive seat, and in particular to an emergency locking device for locking quickly a seat back against movement relative to a seat cushion in the seat, in the case of a sudden collision or deceleration.

2. Description of Prior Art

FIG. 1 shows a typical, conventional seat framework with one reclining device for a vehicle or automotive seat, which is-basically formed by: a seat cushion frame (8) forming a seat cushion of the seat; a generally inverted-U-shaped seat back frame (7) which forms a seat back of the seat, having one lower flattened end (70) at one lateral frame section (7a) thereof; a pair of slide rails (Sa)(Sb); a connecting bracket (2) which is fixed on one of the two slide rails (i.e. Sb) and penetrates through one rearward side portion of the seat cushion frame (8), projecting its upper end portion to which the lower fattened end (70) of seat back frame (7) is rotatably connected via a hinge pin (6); and a reclining device (RD) by means of which the lower end of another lateral frame section (7a) of the seat back frame (7) is rotatably connected to another rearward side portion of the seat cushion frame (8). In this type of seat, the seat back frame (7) (i.e. seat back) can be adjusted in inclination angle, forwardly and backwardly, with respect to the seat cushion frame (8) and locked at a desired inclination angle by operation of the reclining device (RD).

However, in the case of such seat with one reclining device, if great forward and backward loads (FL) (BL) are applied to the seat back frame (7) locked by the reclining device (RD) in a collision or the like, it is highly possible that the foregoing one lateral frame section (7a), namely an unlocked portion, will be deformed, which will further give a great damage or injury to an occupant sitting on the seat.

To solve such problem, one can suggest a seat of a double reclining device type, wherein two reclining devices are provided respectively at both lateral frame sections of seat back frame to permit locking and protecting them against deformation. But, it is defective in increasing a whole weight of the seat and, in most cases, both reclining devices are not easily worked simultaneously, leaving a problem with the synchronized operation of both reclining devices.

SUMMARY OF THE INVENTION

It is a primary purpose of the present invention to provide an emergency locking device for a vehicle seat with one reclining device, which is simplified in structure, light in weight and provides a quick locking of a seat back relative to a seat cushion.

To achieve such purpose, the emergency locking device in accordance with the present invention is basically comprised of:

- a connecting means defined at a seat cushion frame, by which connecting means, one lateral frame section of a seat back frame is rotatably connected to the seat cushion frame, while another lateral frame section of the seat back frame is connected, via one reclining device, to the seat cushion frame;
- an inwardly toothed means defined at one of those one lateral frame section and connecting means; and
- an outwardly toothed means defined at another of those one lateral frame section and connecting means, the outwardly toothed means being so disposed as to be normally disengaged from the inwardly toothed means with a small clearance therebetween.

Accordingly, a displacement of the seat back frame or a slight deformation of same, which is caused by a great load in a collision case or the like, results in a quick engagement of the outwardly toothed means with the inwardly toothed means, thereby locking such one lateral frame section (without reclining device) of the seat back frame with respect to said seat cushion frame. Thus, any further serious deformation of the seat back frame is surely prevented.

Preferably, the inwardly toothed means may comprise a ring body and an inwardly toothed part formed in the inner peripheral side of the ring body.

Preferably, the inwardly toothed means may include two spaced-apart toothed parts, so that, with the displacement of the seat back, the outwardly toothed means may be quickly engaged with one of those two toothed parts of inwardly toothed means, which is effective in locking the seat back frame against either of forward and backward load applied thereto. In this instance, more preferably, the outwardly toothed means may include a pair of outwardly toothed sections which are oriented in an opposite direction to each other, such that the two toothed sections of outwardly toothed means face toward the two toothed parts of inwardly toothed means, respectively, with a small clearance therebetween.

In one aspect of the invention, the outwardly toothed means may include a first end portion and a second elongated end portion, such that the first end portion is fixed to the foregoing another of one lateral frame section and connecting means, while the second elongated end portion is fixed thereto via a link means. This effectively amplifies a load force imparted from the seat back frame as a leverage effect and thus causes more immediate engagement of the outwardly toothed means with the inwardly toothed means.

Any other features and advantages of the present invention will become apparent from reading of the description hereinafter, with reference to the drawings.

DETAILED DESCRIPTION OF PREFERRED EMBODIMENTS OF THE INVENTION

Figure 1:
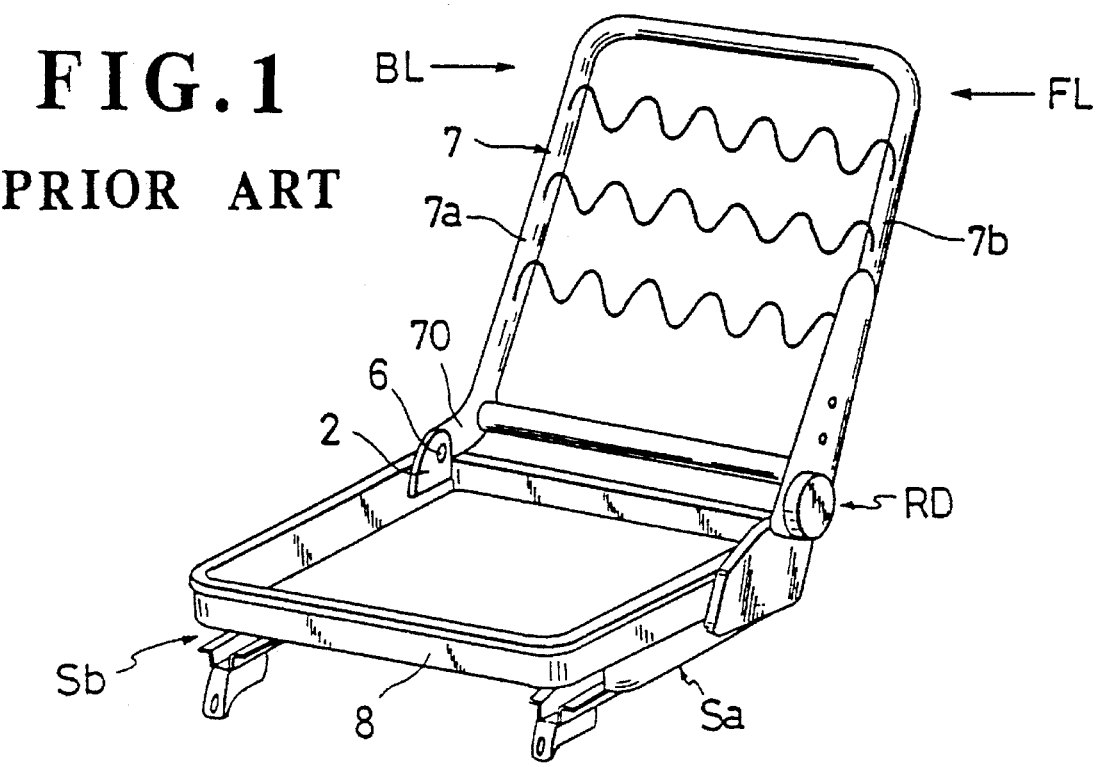
FIG. 1 is a schematic perspective view of conventional framework of seat with one reclining device.

Firstly, it should be understood that the present invention is directed to including an emergency locking device in conventional seat framework with one reclining device as shown in FIG. 1, and thus, a specific description is deleted for the constituent elements of the seat framework other than the locking device according to the invention. All like designations given in FIG. 1, therefore, correspond to all like designations to be used hereinafter.

FIGS. 2 to 5, and FIGS. 6 and 7 show two embodiments of the present invention, but are only example views embodying the inventive concept of the present invention. Both of those two embodiments have in common the following two locking means: an inwardly toothed lock member and an outwardly toothed lock member, as will be described, which are the main features of the present invention that solves the problems of the previously stated prior art.

Referring to FIGS. 2 to 5, there is shown a first embodiment of emergency locking device in accordance with the present invention. The illustrated emergency locking device basically comprises an inwardly toothed lock member (4) fixed to the inward surface of the connecting bracket (2), and an outwardly toothed lock member (3) fixed via an auxiliary connecting bracket (1) to the flattened end (70) of one lateral frame section (7a) of the seat back frame (7).

Figure 4:
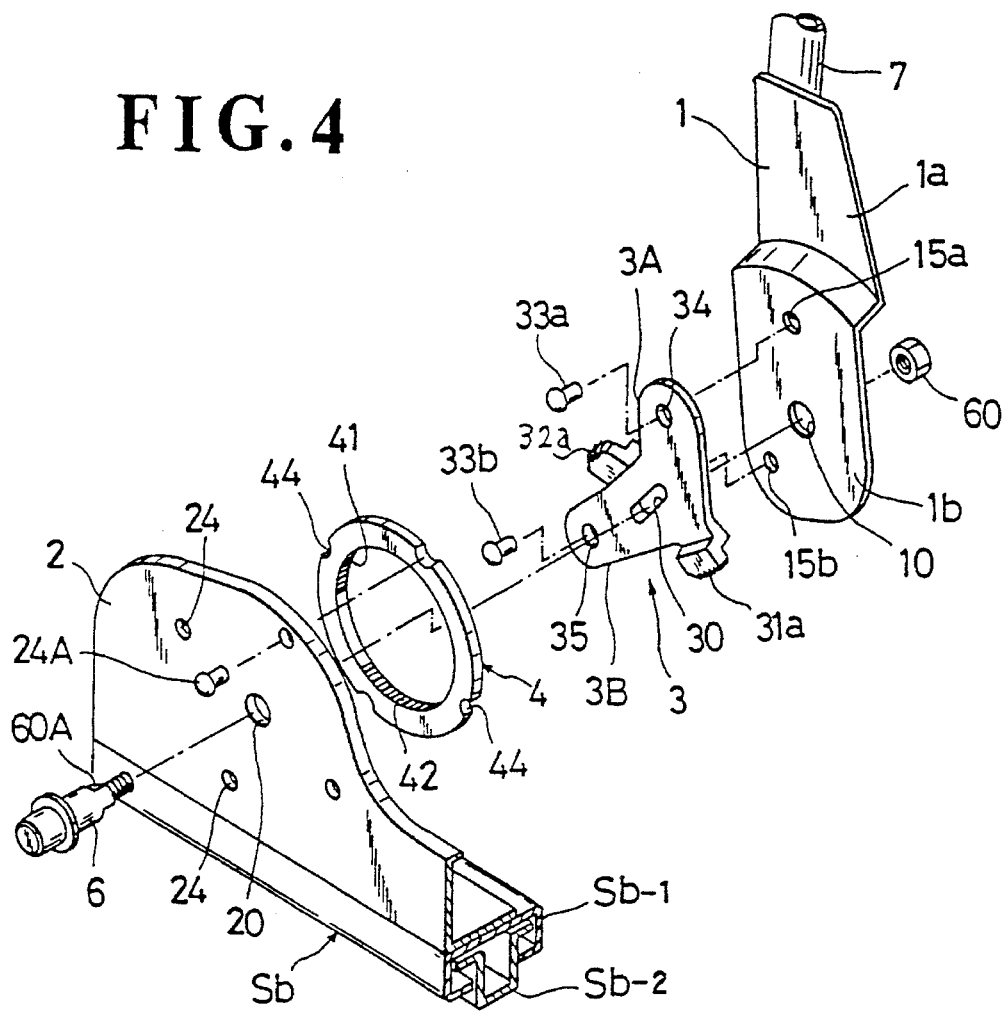
FIG. 4 is a partly broken, exploded perspective view showing one embodiment of the present invention.
Figure 5:
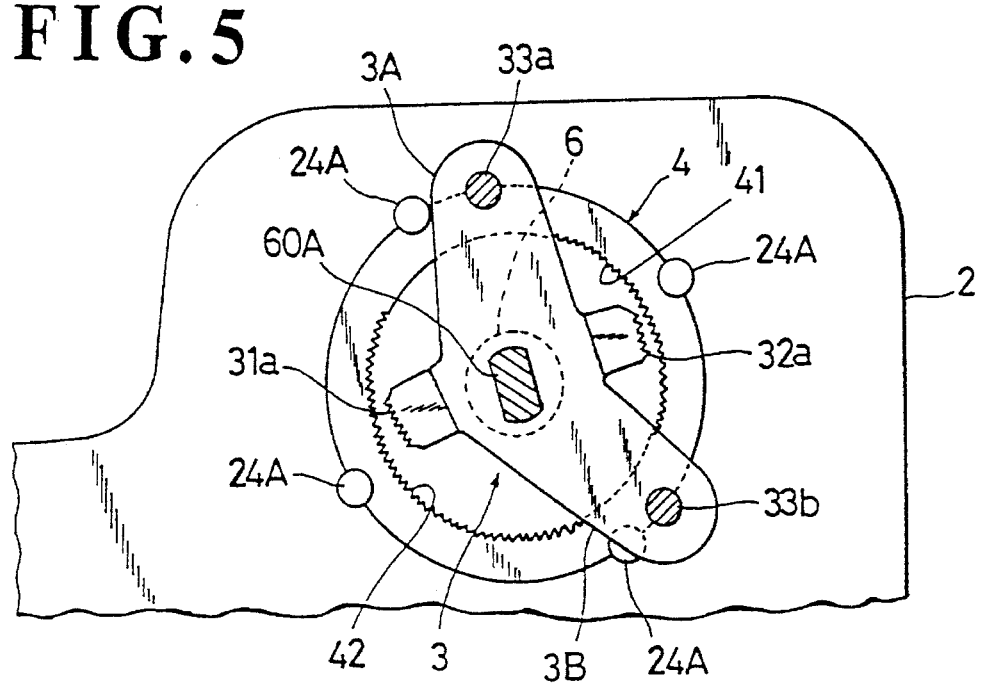
FIG. 5 is a partly broken elevation view of a connecting bracket, showing the embodiment of FIG. 4 to be applied to the inward surface thereof.

As shown in FIG. 4, the inwardly toothed lock member (4) is shown to be formed in a circular ring shape, which has, formed in the inner peripheral side thereof, a first series of plural inwardly projected teeth (41) and a second series of plural inwardly projected teeth (42). As illustrated, those two inwardly teeth (41) (42) are disposed in a manner facing toward each other, but this is not limitative, and instead thereof, a whole inner peripheral side of the ring body may be formed with the same teeth. The outer peripheral side of the lock member (4) is formed with four semi-circular securing recessed portions (44). This inwardly toothed lock member (4) is fixed to the inward wall of the connecting bracket (2) by aligning the four securing semi-circular recessed portions (44) with four securing holes (24) formed in the connecting bracket (4), and inserting four rivets through the thus-aligned securing recessed portions and holes (44) (24), respectively, for revetting to firmly fix the lock ring member (4) to the bracket (2) as seen in FIG. 5.

Figure 3:
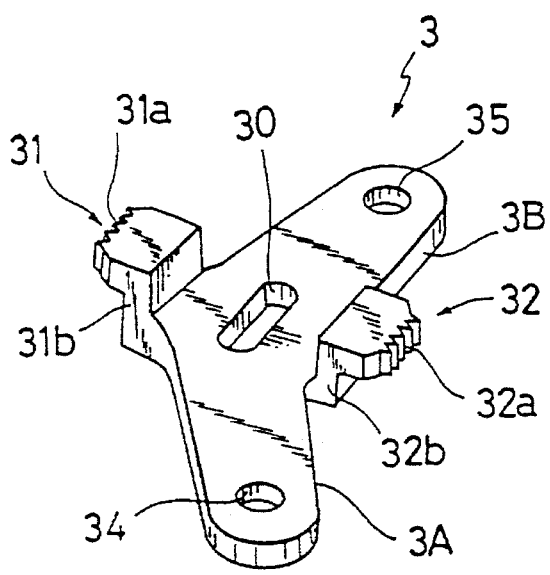
FIG. 3 is a perspective view of an outwardly toothed member as one embodiment in the present invention.

In FIG. 3, the outwardly toothed lock member (3) is shown to be shaped generally in "V" shape, which basically comprises a pair of opposedly extending first and second securing sections (3A) (3B), and a pair of spaced-apart first and second toothed sections (31) (32) which are arranged in a generally crossing relation with those two securing sections (3A) (3B).

The first and second securing sections (3A) (3B) extend outwardly from each other to form a generally "V" shaped body on the whole. A generally rectangular securing hole (30) is formed in the central area of such V-shaped body, and two securing holes (34) (35) are respectively formed in both end parts of the same V-shaped body, i.e. in both ends of the two securing sections (3A) (3B). Further, on the opposite sides of the central area of this body, there are integrally formed the foregoing first and second toothed sections (31) (32). As shown in FIG. 3, the first toothed sections (31) is disposed on the outwardly projected central area of the body, comprising an upwardly erected part (31b) and outwardly extended toothed part (31a) in an integral way, whereas the second toothed section (32) is disposed on the valley central area of the body, comprising an upwardly erected part (32b) and outwardly extended toothed part (32a) in an intergal way. The two toothed parts (32a) (32b) are oriented in an opposite direction to each other, extending on a line generally crossing the central area of the body.

Figure 2:
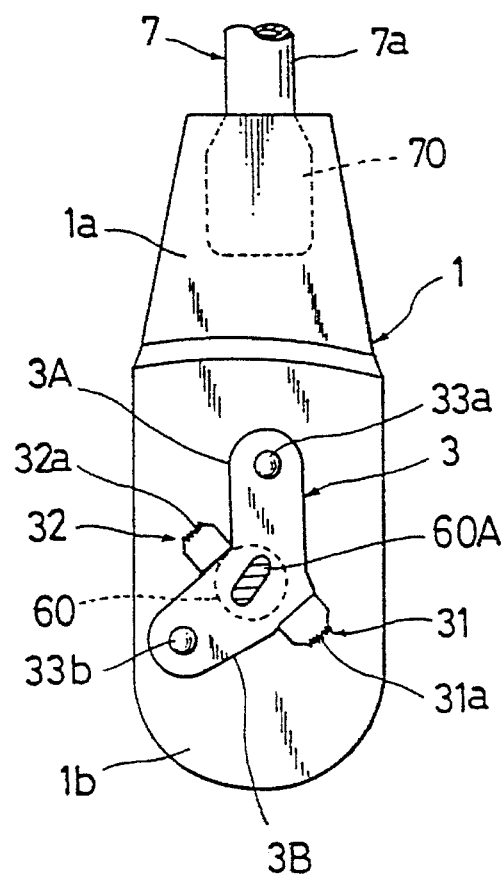
FIG. 2 is a partly broken side view of a seat back frame to which the present invention is applied.

The above-constructed outwardly toothed lock member (3) is fixed to the inward surface of the foregoing auxiliary connecting bracket (1) by two rivets (33a) (33b), as shown in FIGS. 2 and 4, such that the first securing section (3A) extends along the longitudinal direction of both auxiliary bracket (1) and one lateral frame section (7a) of seat back frame (7), thereby setting the inclination angle of both first and second toothed sections (31) (32) relative to that longitudinal direction.

It is noted here that such inclination angle of first and second toothed sections (31) (32) may be determined, depending on the actual normal (i.e. non-reclined) angle of the seat back frame (7) relative to the seat cushion frame (8).

Designations (15a) (15b) in FIG. 4 denote securing holes, through which the two rivets (33a) (33b) are inserted and fixed, respectively, to firmly fix the body of the lock member (3) to the bracket (1)

As understandable from FIGS. 2, 4 and 5, the outwardly toothed lock member (3) fixed to the auxiliary connecting bracket (1) is assembled with the aforementioned inwardly toothed lock member (4), using a hinge pin (6) which is so formed to have a flat part (60A) of a generally rectangular cross-section and a threaded end part, as seen in FIG. 4. Namely, the hinge pin (6) is inserted through a hinge hole (20) formed in the bracket (2), (the bracket (2) is fixed on the upper rail member (Sb-1) which is slidably fitted in the lower rail member (Sb-2), of one slide rail (Sb) as shown), then the flat part (60A) of hinge pin (6) is fitted through the rectangular hole (30) of the outwardly toothed lock member (3), and finally, a securing nut (60) is threadedly engaged to the threaded end part of the hinge pin (6), whereby the auxiliary connecting bracket (1) or the end of one lateral frame section (7a) of seat back frame (7) is rotatably connected to the connecting bracket (2) via the hinge pin (6), while on the other hand, the first and second toothed sections (31) (32) are disposed within the inwardly toothed lock member (4), with the toothed parts (31a) (32a) facing towards the second and first series of inwardly projected teeth (42) (41) of the inwardly toothed lock member (4), respectively, as shown in FIG. 5. In this respect, as in FIG. 5, a proper slight clearance should be given between the first and second toothed sections (31) (32) and the second and first series of inwardly projected teeth (42) (41), so as to permit rotation of the auxiliary bracket (1) about the hinge pin (6). Also, for that purpose, the circular cross-section main body of the hinge pin (6) should be of a proper length slightly greater than the height of both first and second toothed sections (31) (32), including the thickness of the bracket (2), insofar as the respective toothed parts (31a) (32a) of those two sections (31) (32) are not out of registry with the second and first series of teeth (42) (41).

Figure 8:
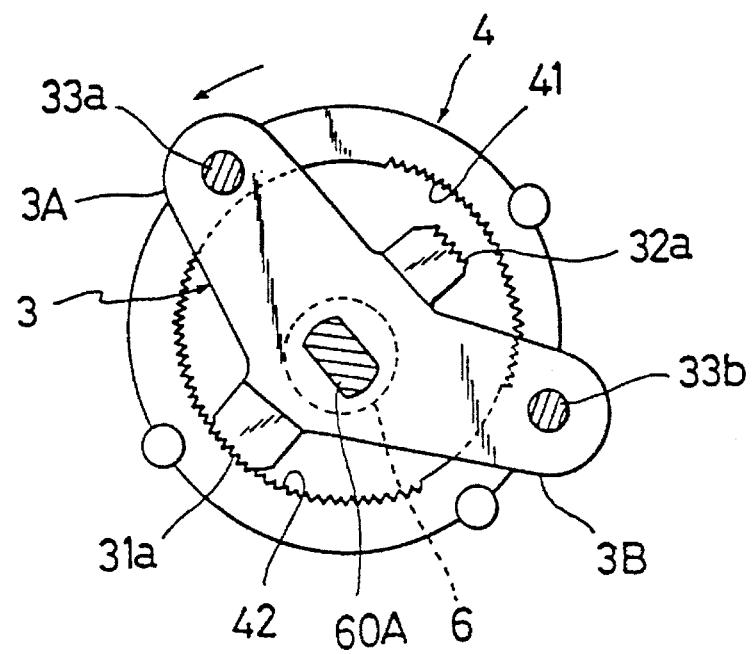
FIGS. 8 and 9 are diagrams showing the locking motions of the embodiment of FIG. 4.

Accordingly, referring now to FIG. 8, if a forward great load (FL) is applied to the seat back frame (7) (i.e. a seat back) as in FIG. 1, the auxiliary connecting bracket (1) imparts the force of load (FL) to the outwardly toothed lock member (3), which is slightly deformed as indicated by the arrow. As a result, the first toothed part (31a) is quickly brought into meshed engagement with a part of the second series of inwardly projected teeth (42), thus locking the lateral frame section (7a) of seat back frame (7) against movement in cooperation with the locked state of the reclining device (RD) on other lateral frame section (7b) of the same seat back frame (7). Hence, the seat back frame (7) is protected against deformation due to this forward great load (FL). Reversely, referring to FIG. 9, if a backward great load (BL) is applied to the seat back frame (7) as in FIG. 1, the auxiliary connecting bracket (1) is slightly deformed as indicated in the arrow, which quickly brings the second toothed part (32a) into meshed engagement with a part of the first series of inwardly projected teeth (41), thus locking the lateral frame section (7a) of seat back frame against movement in cooperation with the locked state of the reclining device (RD). Thus, in this case also, the seat back frame (7) is protected against deformation.

Figure 6:
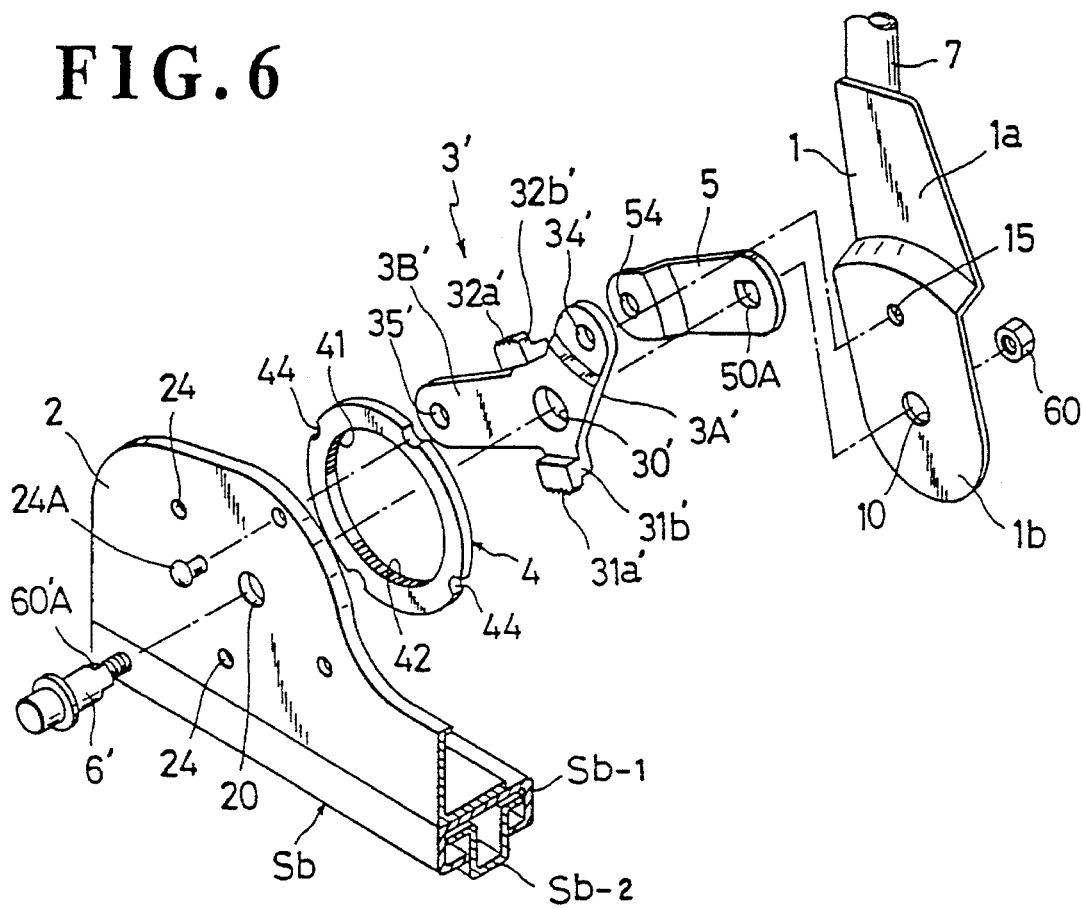
FIG. 6 is a partly broken, exploded perspective view showing another embodiment of the present invention.
Figure 7:
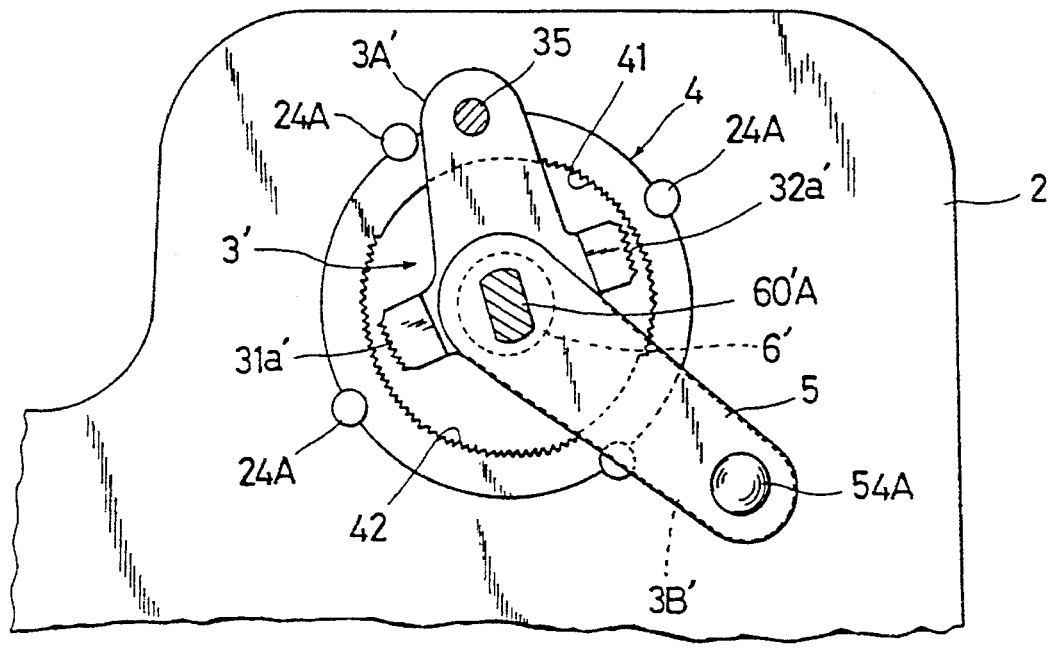
FIG. 7 is a partly broken elevation view of a connecting bracket, showing the embodiment of FIG. 6 to be applied to the inward surface thereof.

FIGS. 6 and 7 shows another embodiment of emergency locking device in accordance with the present invention.

In this embodiment, a main different aspect from the above-described first embodiment is a different configuration of outwardly toothed lock member (3') which has a second elongated securing section (3B') and a circular hole (30'), but the shape of the lock member (3') is the same "V" shape with that of the lock member (3) mentioned above. Other portions of that lock member (3') are also similar to those of the foregoing first-embodiment outwardly toothed lock member (3), in terms of the lock member (3') including a first securing section (3A'), two securing holes (34') (35'), and a pair of spaced-apart first and second toothed sections, each having upwardly erected part (31b' or 32b') and outwardly extending toothed part (31a' or 32b').

The elongation of the second securing (3B') serves to amplify the forward or backward load (FL) (BL) and therefore cause more immediate engagement of one of the first and second toothed parts (31a) (32a) with a part of corresponding one of the second and first series of inwardly projected teeth (42) (41). This is because a greater amount of the load force is imparted through the large securing sections 3A' 3B') as a leverage effect, in comparison with the size of the foregoing first-embodiment outwardly toothed lock member (3), thus resulting in such more immediate engagement between the outwardly and inwardly lock members (3') (4). In the present second embodiment, there is provide a link member (5) of a length substantially equal to a distance between the end of the elongated second securing section (3B') and central area of body of the outwardly toothed lock member (3'). The outwardly toothed lock member (3') is assembled with the inwardly toothed lock member (4) fixed to the bracket (2) and the auxiliary connecting bracket (1), by inserting the circular cross-section part of a hinge pin (6') through the hole (20) of bracket (2) and hole (30') of the outwardly lock member (3'), further inserting the generally rectangular cross-section of flat part (60A') of the hinge pin (6') into the generally rectangular hole (50A) of the link member (5), and finally engaging threadedly the nut (60) to the threaded end part of the same pin (6'). At the same time, the free end of such link member (5) is firmly connected to that of the foregoing second securing section (3B') by means of a rivet (54A), as can be seen from FIG. 7. Here, looking at both FIGS. 6 and 7, the rivet (54A) is inserted and fixed in both holes (35') (54) of those two elements (3B') and (5) for integral connection thereof. Also, during this process, a rivet (35) is inserted through the hole (34') of outwardly toothed lock member (3') and fixed in a hole (15) formed in the auxiliary connecting bracket (1), so as to firmly attach both outwardly toothed lock member (3') and link member (5) to the inward side of the auxiliary connecting bracket (1), as understandable from FIGS. 6 and 7.

Figure 9:
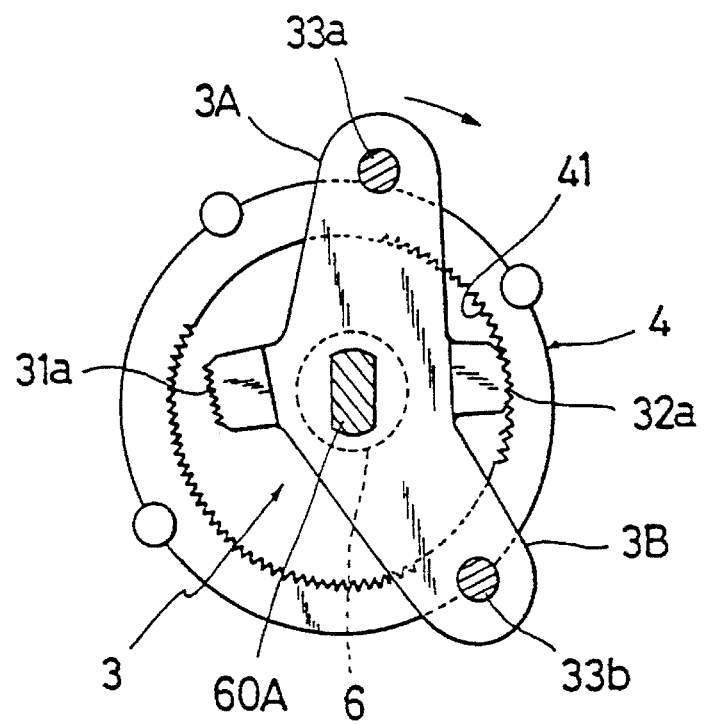

Accordingly, according to the present second embodiment, although not shown, it is to be appreciated that, in a collision case, the forward or backward load force (FL) (FB) imparted from the auxiliary connecting bracket (1) is amplified by the leverage effect of both link member (5) and second securing section (3B') to cause slight deformation of that bracket (1) and more immediate meshed engagement of one of the first and second toothed parts (31a') (32b') with the corresponding one of the second and first series of inwardly projected teeth (42) (41), in comparison with the foregoing outwardly toothed lock member (3), as assumable from FIGS. 8 and 9. This particular embodiment provides a much more quick locking of one lateral frame section (7a) in cooperation with the locked state of the reclining device (RD) to prevent deformation of the seat back frame (7).

As shown in FIG. 6, designations (1a) and (1b) denote an upper part and a lower mounting part of the auxiliary connecting bracket (1), respectively. But, this is not limitative: The shape of this bracket (1) may be varied properly, depending on the design of the seat.

Again, it should be understood that the above-described two embodiments are only preferred ones embodying the major features of the present invention, and the invention is not limited thereto, but any other structural modifications, replacements and additions may be made to materialize or facilitate the emergency locking functions of the outwardly and inwardly toothed elements (i.e. 3 or 3' and 4), without departing from the scopes of the appended claims. For example, in contrast to the illustrated embodiments, the outwardly toothed element (3 or 3') may be provided at the connecting bracket (2) while the inwardly toothed element (4) may be provided at the auxiliary connecting bracket (1). Further, for structural simplification purpose, the outwardly toothed lock element (3 or 3') may be formed as a unit with the inward surface of the auxiliary connecting bracket (1), and also the inwardly toothed lock element (4) may be formed as a unit with the inward surface of the connecting bracket (2), as by means of a proper molding.

Accordingly, in accordance with the present invention, the structure of the locking device per se is much simplified and light in weight, as the number of its constituent elements is relatively small, as compared with the seat framework of the dual reclining type having a reclining devices provided at both lateral frame sections of seat back frame. In addition, the arrangement of the outwardly and inwardly lock elements (3 or 3' and 4) with a small clearance therebetween effectively insures a quick locking of such one lateral side frame section (7a) with no reclining device, against further serious deforamation in a collision case or the like, while in a normal state excepting such collision case, it permits free inclination of the seat back frame with respect to the seat cushion frame.

What is claimed is:

1. An emergency locking device mounted to a vehicle seat, in which the vehicle seat includes a seat cushion frame, a seat back frame having one lateral frame section and another lateral frame section, said seat back frame being rotatably connected to said seat cushion frame, and one reclining device which connects said another lateral frame section of said seat back frame to said seat cushion frame, said emergency locking device comprising:

a first bracket fixed to said one lateral frame section of said seat back frame, said first bracket being deformable under a sudden load, connecting means engaged on said seat cushion frame for rotatably connecting said one lateral frame section to said seat cushion frame;

inwardly toothed means fixed to a second bracket on said seat cushion frame;

outwardly toothed means fixed to said first bracket;

said first bracket and said second bracket being rotatably engaged by said connecting means so that said outwardly toothed means are spaced apart from and within said inwardly toothed means when in a normally disengaged position;

a full periphery of said connecting means being in respective contact with each of said first bracket and said second bracket, wherein, when said sudden load is applied to said seat back frame, said seat back frame is displaced and said first bracket means is deformed, resulting in a quick engagement of said outwardly toothed means with said inwardly toothed means, thereby locking said one lateral frame section of said seat back frame with respect to said seat cushion frame.

2. The device in accordance with claim 1, wherein said inwardly toothed means comprises a ring body and an inwardly toothed part formed in an inner peripheral side of said ring body.

3. The device in accordance with claim 1, wherein said inwardly toothed means includes two spaced-apart toothed parts, so that, with said displacement of said seat back frame, said outwardly toothed means is quickly engaged with one of said two spaced-apart toothed parts of said inwardly toothed means.

4. The device in accordance with claim 1, wherein said outwardly toothed means is an outwardly toothed member comprising a securing section and an outwardly toothed section, and wherein said securing section of said outwardly toothed member is fixed to said first bracket and said connecting means, such as to dispose said outwardly toothed section in a state of being normally disengaged from said inwardly toothed means with a small clearance therebetween.

5. The device in accordance with claim 1, wherein said outwardly toothed means includes a pair of said outwardly toothed sections which are oriented in an opposite direction to each other and are in a state of being normally disengaged from said inwardly toothed means with a small clearance therebetween 6. The device in accordance with claim 1, wherein said connecting means comprises a connecting bracket disposed at said seat cushion frame and a hinge pin, and herein said hinge pin is inserted through said first connecting bracket and one of said outwardly and inwardly toothed means, and fixed to a lower end portion of said one lateral side frame section of said seat back frame such as to permit free rotation of said seat back frame with respect to said seat cushion frame in a normal state excepting said displacement of said seat back frame caused by said great load.

7. The device in accordance with claim 1, wherein said connecting means comprises a hinge pin, said hinge pin being inserted through said second bracket and said outwardly toothed means and said inwardly toothed means, said hinge pin being fixed to a lower end portion of said one lateral side frame section of said seat back frame to permit free rotation of said seat back frame with respect to said seat cushion frame in a normal state except when said seat back frame is displaced by said sudden load.

8. The device in accordance with claim 1 wherein said first bracket comprises an auxiliary connecting bracket fixed to a lower end portion of said one lateral frame section of said seat back frame.

9. An emergency locking device mounted to a vehicle seat, in which the vehicle seat includes a seat cushion frame, a seat back frame having one lateral frame section and another lateral frame section, said seat back frame being rotatably connected to said seat cushion frame, and one reclining device which connects said another lateral frame section of said seat back frame to said seat cushion frame, said emergency locking device comprising:

a first bracket fixed to said one lateral frame section of said seat back frame;

said first bracket being deformable under a sudden load;

connecting means engaged on said seat cushion frame for rotatably connecting said one lateral frame section to said seat cushion frame;

inwardly toothed means fixed to a second bracket engaged to said seat cushion frame;

outwardly toothed means fixed to said first bracket;

said first bracket and said second bracket being rotatably engaged by said connecting means so that said outwardly toothed means are rotatably spaced apart from an within said inwardly toothed means when in a normally disengaged position;

wherein said outwardly toothed member comprises a securing section and an outwardly toothed section, wherein said securing section includes a first end portion and a second elongated end portion;

a link means;

said first end portion of said securing section associated with said outwardly toothed member and being fixed to said first bracket and connecting means;

* * * * *